3,168,294
MIXING APPARATUS WHEREIN MAGNETS ARE UTILIZED
Tadashi Hasumura, 3677 Kugenuma, Fujisawa, Kanagawa Prefecture, Japan
Filed Dec. 20, 1960, Ser. No. 77,234
Claims priority, application Japan, Aug. 15, 1960, 35/34,662
1 Claim. (Cl. 259—108)

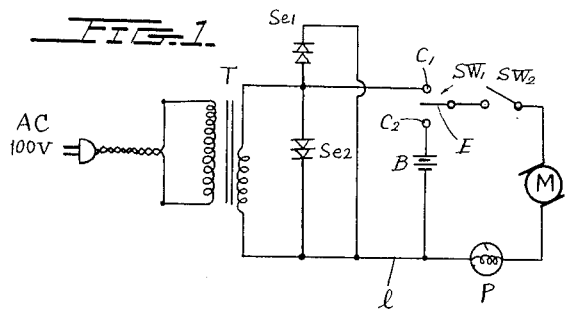

This invention relates to an apparatus which effects mixing of substances by means of a rotatable permanent magnet, more particularly to an apparatus wherein a rotatable permanent magnet having a member that functions as a mixer blade is placed in a container within which substances to be mixed are contained, and rotating another magnet below a base on which said container is mounted, thereby effecting mixing through rotation of said rotatable permanent magnet by an attractive force and repulsion between the magnets.

The principal object of this invention is to effect mixing of a liquid by immersing a rotatable member into the liquid within the container.

An additional object of the present invention is to provide a base portion, in which is concealed the apparatus for imparting rotary force to said rotatable member within the container.

A further object of the present invention is to provide a stirring device which can be operated from a battery or from an A.C. source.

In the broadest sense, the invention comprises a transparent container made of glass or plastics which can contain water, fruit juice, alcohol beverage, etc., therein; and a blade-shaped mixer member inserted in said container; a motor which is either mounted below the suitable base on which the container is mounted or is placed within a box; connecting a rotary shaft of said motor with the centre of another bar or horseshoe magnet via a reduction gear; placing the container having therein said rotatable permanent magnet directly over the rotatable magnet on said base or in a box so as to cause the rotatable permanent magnet to rotate due to magnetic force applied via the bar or horseshoe magnet, which produces a positive drive when the motor is switched on to effect mixing of the liquid in the container within which a permanent magnet is also placed.

Other objects and features of the invention will become apparent as the description proceeds, especially when taken in conjunction with the accompanying drawings wherein:

FIG. 1 is an electric circuit view showing a sketch of an apparatus according to the invention.

FIG. 2 is a vertical side view showing the rotation, viz., the principle of mixing operation.

FIG. 3 is a vertical side view showing an embodiment designed for a specific use of the apparatus according to the invention.

FIG. 4 is a two level plan view of FIG. 3 wherein the upper section shows parts with part of the upper base removed while the lower section is a plan view taken above the container and mixing rod.

A D.C. motor is used as the driver for the mixing apparatus of this invention. It is therefore possible to use batteries as the power source or a rectified A.C. source where A.C. is available.

Accordingly, the apparatus of this invention can be used for both A.C. and D.C. by contacting a switch E with either contact C1 for A.C. or contact C2 for D.C. By a suitable transformer T, voltage of A.C. power source is dropped to 1.5 v.–3.0 v., and a conductor 1 led from a secondary terminal thereof is connected to one of the input terminals of the motor M, and another conductor from the other terminal of the secondary of the transformer is connected to a switch contact C1 via rectifiers Se1 and Se2. On the other hand, another switch contact C2 is connected to a D.C. power source, for instance, to a pole of a battery B, and another pole of the same battery is connected to conductor 1 which is led directly to a terminal of the motor M from said rectified power source. In order to reduce leakage of the battery as far as practicable, a switch SW2 is specifically inserted in the battery circuit, and a pilot lamp P is provided at middle of the conductor 1 for indication of functioning of these electric circuits.

When change-over switch SW1 is connected to either contact C1 or contact C2, the motor M starts to rotate, and the driving force of the rotary shaft of this motor M is transferred to a suitable reduction gear arrangement 10 as shown in FIG. 2. The tip of a shaft 11 extending from the reduction arrangement 10 is fixed on the centre of a horseshoe permanent magnet 12, thus causing the magnet to rotate by rotation of the shaft 11. As to this magnet, it is to be understood that utilization of such a horseshoe magnet is the most simplified method, but the shape thereof may be bar-like, or an electromagnet may be used. Both magnetic poles of this horseshoe magnet 12 are positioned as close as possible to the lower face of the base or supporting surface 13, without contacting it.

An armature or permanent magnet 17 is fixed on the tip of a rod 16 of suitable length at a right angle to said rod, providing a tip or step bearing 18 on the central portion in a direction opposite to said rod 16, so that it can be readily rotated, and a mixing blade is integrally secured on the periphery of this permanent magnet 17, but the mixing blade is a separate element from the permanent magnet 17, and it may be arranged, for instance, by directly intersecting with the magnet, or it may be fixed, if the occasion arises, on the middle of the rod 16.

As is apparent from the foregoing descriptions, the mixing apparatus according to the invention affords various facilities by virtue of the fact that the mixer member and container, within which substances to be mixed are contained, and the power source for mixer rotation are entirely separated from each other. And, because a power transferring shaft does not pass through the bottom of the container as in the case of electrical mixers heretofore, there is no need of a seal on the periphery of the shaft, and as the mixing blade is secured on bottom of the container, cleaning of the bottom thereof can be done easily and it is therefore a most sanitary apparatus.

Further, as the container and mixing blade are not of integral construction, and as the mixing blade can be taken out easily, there is no need of using a specific container, thus permitting any container to use a mixing blade therein according to the invention, unless its bottom is extremely thick, and the mixing operation is effected as soon as it is mounted on the base 13.

What is shown in FIG. 3 and FIG. 4 is a horseshoe permanent magnet 12' mounted on a support frame 22 with vertical shaft 21 within an apparatus holder or box 20, so as to permit horizontal rotation of the magnet 12', a worm gear 23 is fixed to said vertical shaft 21 and engages a worm gear 24 secured to a rotary shaft of the motor M, to cause the permanent magnet 12' to rotate through suitable reduction of the motor speed. Power source of this motor M is taken either from a battery B contained within said apparatus holder or box, or from a plug socket (not shown) connected with an A.C. source, and the upper face of the apparatus holder or box is covered with a lid 13'.

As described in the foregoing, according to the present invention, when a rotatable member 17' is thrown into any container (either of transparent or opaque material), it is driven by switching the motor on, the horseshoe permanent magnet 12' fixed to the vertical shaft 21 starts to rotate horizontally, and because the magnetic rotatable member 17' in the container 15' is in a strong magnetic field of the permanent magnet 12', the magnetic member 17' rotates in the same direction following the rotation of the permanent magnet 12'. Thus, it is possible to produce mixing and to give people who look at it an impression of curiosity if it is displayed at a counter, and in addition to that, if the rotatable member 17' and pinching rod 16' are decorated suitably, they can continue rotative movement for show. Therefore, the apparatus can also be effectively utilized for advertising purposes.

What I claim is:

In a liquid stirring device, a frame and a horizontal supporting surface fixed with said frame in spaced relation thereabove, a shaft journaled in said frame below said surface, for rotation on a vertical axis, a first magnet fixed with the upper end of said shaft symmetrically of said axis for rotation contiguous and below said surface, a motor fixed with said frame, a speed-reducing driving connection between said motor and shaft, a stirring rod adapted to be inserted into a liquid container supported on said surface in alignment with said axis, a second magnet secured to said rod adjacent the lower end thereof, and a bladed stirring element removably mounted on said rod for rotation as a unit therewith, a step-bearing fixed with and below said second magnet in axial alignment with said rod, said rod, second magnet and element forming an assembly dynamically balanced about the axis of said rod and step bearing, said motor being a D.C. machine, a battery mounted to said frame, a step-down transformer, a rectifier, and circuit means connecting said motor, battery, the secondary of said transformer and said rectifier, said circuit means including switch means operable to alternatively connect said motor in series with said battery or said rectifier.

References Cited in the file of this patent
UNITED STATES PATENTS

| | | |
|---|---|---|
| 1,420,774 | Stainbrook | June 27, 1922 |
| 2,459,224 | Hendrika | Jan. 18, 1949 |
| 2,549,121 | Osterheld | Apr. 17, 1951 |
| 2,566,743 | Okulitch et al. | Sept. 4, 1951 |
| 2,619,331 | Morrison | Nov. 25, 1952 |
| 2,740,029 | Kueser et al. | Mar. 27, 1956 |
| 2,820,619 | Dache | Jan. 21 1958 |
| 2,859,020 | Eddy et al. | Nov. 4, 1958 |
| 2,867,039 | Zach | Jan. 6, 1959 |

FOREIGN PATENTS

| | | |
|---|---|---|
| 531,130 | Belgium | Aug. 31, 1954 |
| 805,909 | Great Britain | Dec. 17, 1958 |
| 344,639 | Switzerland | Mar. 31, 1960 |